United States Patent
Yamada et al.

(12) 
(10) Patent No.: US 6,868,161 B1
(45) Date of Patent: Mar. 15, 2005

(54) TRANSMITTING/RECEIVING DEVICE AND TRANSMITTING/RECEIVING METHOD

(75) Inventors: Yuji Yamada, Tokyo (JP); Hirofumi Kurisu, Kanagawa (JP)

(73) Assignee: Sony Corporation, Tokyo (JP)

( * ) Notice: Subject to any disclaimer, the term of this patent is extended or adjusted under 35 U.S.C. 154(b) by 704 days.

(21) Appl. No.: 09/694,990

(22) Filed: Oct. 24, 2000

(30) Foreign Application Priority Data

Oct. 25, 1999 (JP) .......................................... P11-302664

(51) Int. Cl.$^7$ ............................................... H04R 5/00
(52) U.S. Cl. ........................................ 381/1; 381/311
(58) Field of Search ............................ 381/1, 309, 311, 381/74, 370, 310

(56) References Cited

U.S. PATENT DOCUMENTS

| | | | |
|---|---|---|---|
| 6,021,205 A | * | 2/2000 | Yamada et al. ............. 381/310 |
| 6,212,282 B1 | * | 4/2001 | Mershon ....................... 381/77 |
| 6,608,907 B1 | * | 8/2003 | Lee .............................. 381/311 |
| 6,614,912 B1 | * | 9/2003 | Yamada et al. ............. 381/310 |

* cited by examiner

Primary Examiner—Stella Woo
(74) Attorney, Agent, or Firm—Jay H. Maioli

(57) ABSTRACT

A transmitting/receiving device and a transmitting/receiving method for transmitting and receiving an acoustic signal through infrared radiation or the like are obtained wherein noise and interruption of the sound due to overmodulation of a transmitting device in compressing/expanding and transmitting the acoustic signal are not generated. In a transmitting/receiving device or a transmitting/receiving method having a receiving device for receiving a signal wireless-transmitted from a transmitting device, demodulating the signal to obtain an analog signal, and outputting the signal, wherein an analog acoustic signal input into the transmitting device is digitized, subjected to signal processing, analog-converted, and output. In the signal processing, the input digital signal is delayed and a level of the delay output signal is compressed or expanded according to a level of the input signal.

10 Claims, 8 Drawing Sheets

Emphasis Characteristic Diagram

FIG. 10B

De-Emphasis Characteristic Diagram

FIG. 11

Input/Output Characteristic Diagram

Time Constant

TRANSMITTING/RECEIVING DEVICE AND TRANSMITTING/RECEIVING METHOD

BACKGROUND OF THE INVENTION

1. Field of the Invention

The present invention relates to a transmitting/receiving device and a transmitting/receiving method for wireless-transmitting/receiving analog acoustic signals.

2. Description of the Related Art

Figure 9:
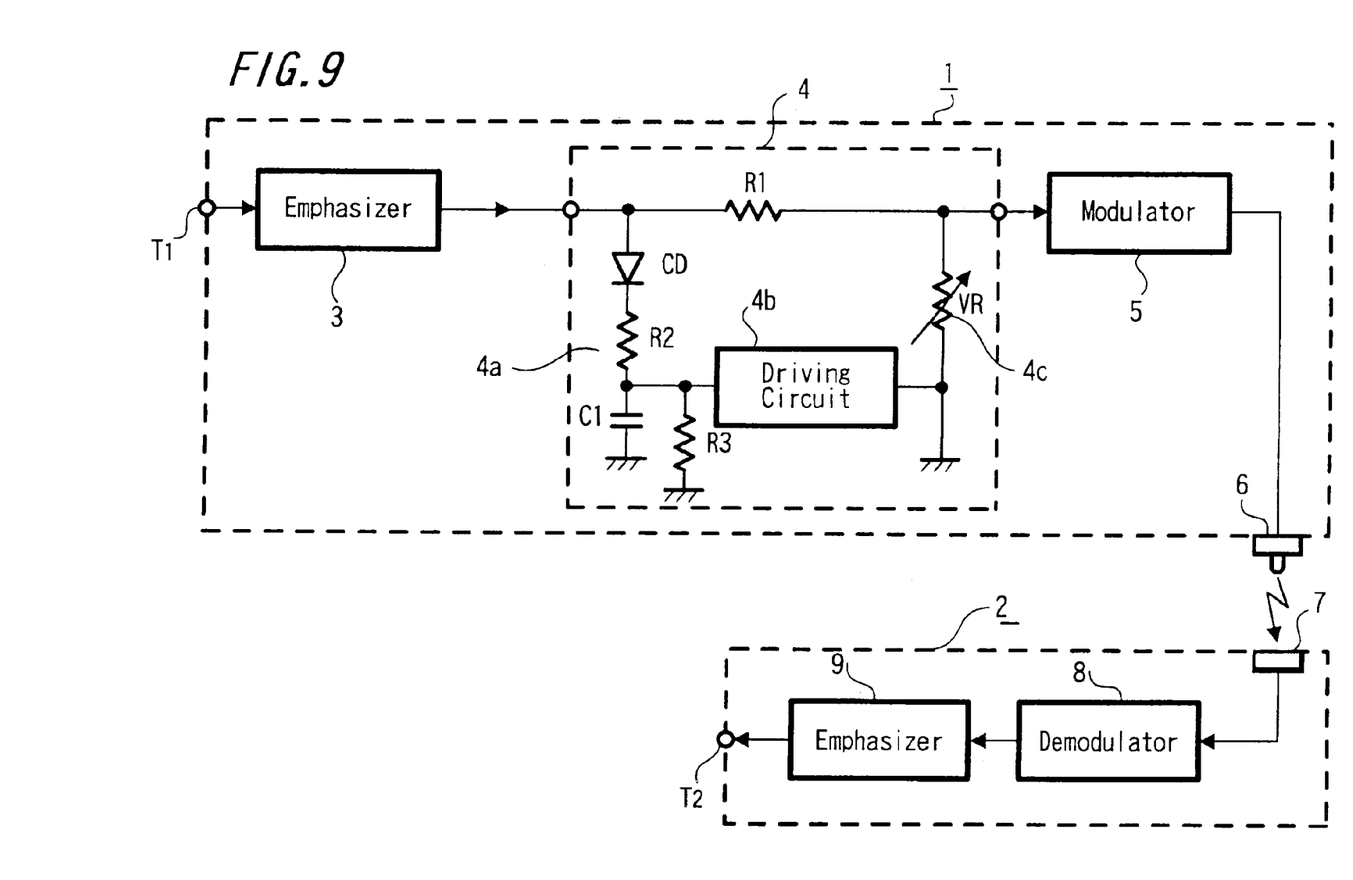
FIG. 9 is a system diagram of a prior-art transmitting/receiving device.

Conventionally, an infrared transmitting/receiving device in which an analog acoustic signal is modulated and wireless-transmitted through a transmitting device by using infrared radiation or the like, the analog acoustic signal is demodulated by a receiving device, and the analog acoustic signal comes as a sound out of a speaker or the like is well-known. FIG. 9 is a system diagram of the above infrared transmitting/receiving device. In FIG. 9, a reference numerals designates a transmitting device as a first device and 2 a receiving device as a second device. Through a transmission line between the transmitting and receiving devices 1 and 2, transmission is carried out by using infrared radiation.

An analog acoustic signal such as voice and tone is supplied as an input signal to an input terminal $T_1$ of the transmitting device 1.

The input signal is supplied to an emphasizer 3. In the emphasizer 3, a high-frequency boosting characteristic $H_B$ for boosting high frequencies of the input signal is applied to the input signal as shown in an emphasis characteristic diagram in FIG. 10(A) in which a level of the input signal is plotted in a vertical axis and a frequency of the input signal is plotted in a horizontal axis and the input signal is supplied to a compression circuit 4 for compressing the voice and the like in the next stage.

The compression circuit 4 is formed of: a line resistor $R_1$; a time constant circuit 4a in which an anode of a diode CD is connected to a line, a series circuit of a resistor $R_2$ and a capacitor $C_1$ is connected to a cathode of the diode CD, and an end of the capacitor $C_1$ is grounded a resistor $R_3$ is connected in parallel to the capacitor $C_1$, and an end of the resistor $R_3$ is 1 grounded; a driving circuit 4b connected to an output end of the time constant circuit 4a, and a variable resistor 4c that is connected between an output end of the line resistor $R_1$ and a ground and controls resistance of a variable resistance element VR by an output voltage of the driving circuit 4b.

An output signal output from the emphasizer 3 is rectified and smoothed by the time constant circuit 4a in the above compression circuit 4, direct voltage according to a level of the input signal is supplied to the driving circuit 4b, the variable resistor 4c is driven by the driving circuit 4b, a level of the input signal of the line resistor $R_1$ is changed, the input signal is compressed and supplied from an output end of the compression circuit 4 to a modulator 5, and a modulated signal is transmitted to space from the transmitting device 1 through a transmitting element 6 such as an infrared diode.

Figure 10A:
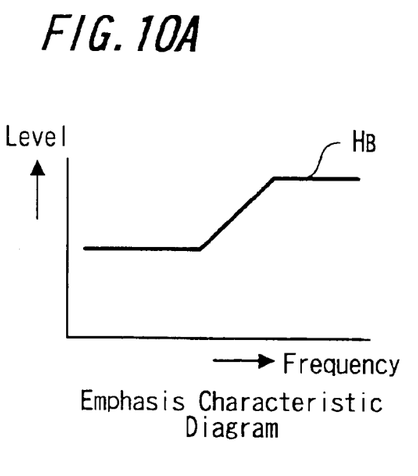
FIGS. 10(A) and 10(B) are emphasis and de-emphasis characteristic diagrams.
Figure 10B:
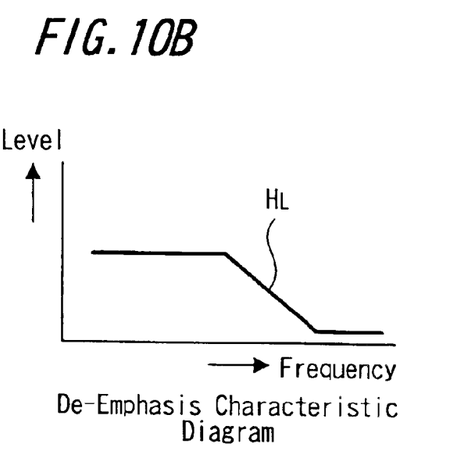

In the receiving device 2, the transmitted signal is received by a receiving element 7 such as a pin and a photodiode, demodulated by a demodulator 8, and supplied to a de-emphasis circuit 9 having a high-frequency down characteristic $H_L$ as shown in FIG. 10(B) that is a characteristic reverse to that of the emphasis circuit 3, and high frequencies of the transmitted signal are reduced in the de-emphasis circuit 9. In other words, an expanding operation is carried out and an analog acoustic signal is output to an output terminal $T_2$ to which a headphone or the like is connected.

Figure 11:
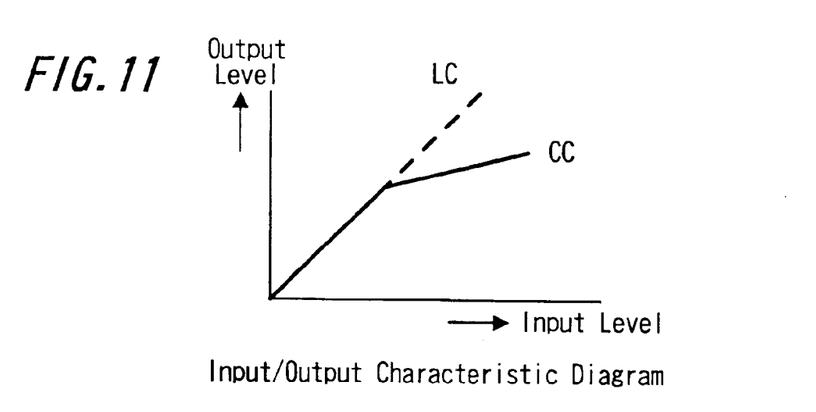
FIG. 11 is a compression characteristic diagram of the prior art.

According to the transmitting/receiving device with the above structure, when the input level of the input signal increases as shown by an input/output characteristic in FIG. 11, the compression circuit 4 operates to control the level of the input signal so as to obtain a compression characteristic CC and such that an input level does not exceed a predetermined value as compared with a linear characteristic LC.

Therefore, it is possible to suppress apparent S/N degradation of a received signal due to a narrow dynamic range of the infrared wireless analog transmission line and to improve the dynamic range.

According to the above transmitting/receiving device and transmitting/receiving method of the acoustic signal, the time constant circuit 4a is necessary to detect the level of the input signal and a time delay is generated before the time constant circuit 4a operates to change a value of the variable resistor 4c into a value at a predetermined level through the driving circuit 4b.

Figure 12A:
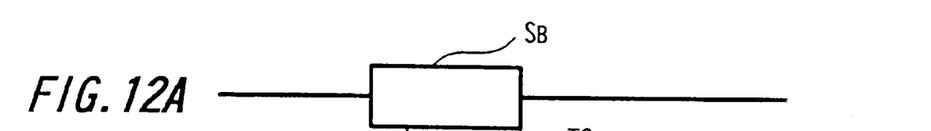
FIGS. 12(A) to 12(C) are waveform diagrams of a prior-art time constant circuit.
Figure 12B:
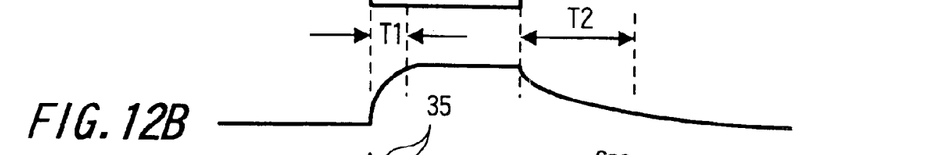

If a burst signal $S_B$ as shown in FIG. 12(A) is supplied as an input signal to the compression circuit 4, delays $T_1$ and $T_2$ corresponding to the time constant of the time constant circuit 4a are generated at a rising edge and a falling edge of the burst signal $S_B$ and time $T_1$ is required to judge a correct level at the rising edge as shown in FIG. 12(B). If a frequency of the input signal is higher than the time constant of the time constant circuit 4a, a signal input during this period cannot be compressed and is output as it is.

Figure 12C:
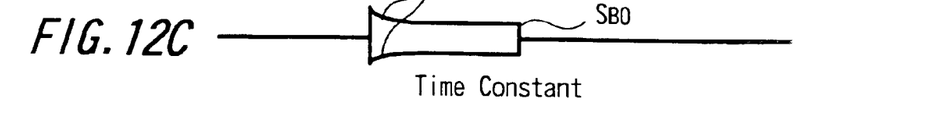

FIG. 12(C) shows an output of the burst signal at this time. The transmitting device 1 is brought into an over-modulation state and a noise may be generated and the sounds may be interrupted in transmitted and received sounds at the rising edge 35 of the burst output signal $S_{BO}$. Even if a signal in a specific frequency band is large, because every frequency band is attenuated simultaneously by the compression circuit 4, volume may be felt to be small only during operation of the compression circuit 4.

The present invention has been accomplished to solve the above problems and it is an object of the invention to provide a transmitting/receiving device and a transmitting/receiving method in which generation of noise and interruption of sound in transmitted/received sound are prevented and a feeling of reduction of a level is suppressed, the noise and interruption of the sound being generated when an acoustic signal is compressed and transmitted through a time constant circuit of a compression circuit, a part of the input signal cannot be compressed and output as it is, and the transmitting device is brought into an overmodulation state.

SUMMARY OF INVENTION

According to a first invention, there is provided a wireless transmitting/receiving device comprising: a first device 1 having transmitting means for modulating and transmitting an analog input signal such as an acoustic signal; and a second device 2 having receiving means for receiving a signal transmitted from the first device 1, demodulating the signal to obtain an analog input signal, and outputting the signal, wherein the first device 1 includes: signal processing means 12 for applying signal processing to a digital signal obtained by digitizing the analog input signal; digital-to-analog converting means 18 for converting an output digital signal from the signal processing means 12 into an analog input signal; and emphasis means 3 for increasing a gain of a high-frequency signal of the analog input signal converted by the digital-to-analog converting means 18, and the signal processing means 12 includes: delay means 13 for delaying the digital processing signal; and signal compressing/expanding means 23 for compressing or expanding a level of a delay output signal of the delay means 13 according to a level of an input signal of the signal processing means 12.

According to a second invention, in the first invention, there is provided a transmitting/receiving device, wherein the used signal compressing/expanding means 23 includes: frequency characteristic control means 15 for applying a frequency characteristic to the digital signal supplied to the signal processing means 12; absolute value detecting means 16 for detecting an absolute value of a signal level of an output signal applied with the frequency characteristic by the frequency characteristic control means 15; and level control means 17 for changing the level of the output signal of the delay means 12 according to the absolute value detected by the absolute value detecting means 16.

According to the transmitting/receiving device of the first and second inventions, if a delay time of the delay circuit 13 in the signal processing circuit 12 is fixed in advance as a value whose input level is predicted, it is possible to prevent delay of rise time of the input signal, overmodulation of the first device 1 as the transmitting device, and noise and interruption of sound generated in transmission/reception between the first device and the second device as the receiving device.

According to a third invention, there is provided a wireless transmitting/receiving device comprising: a first device 1 having transmitting means for modulating and transmitting an analog input signal such as an acoustic signal; and a second device 2 having receiving means for receiving a signal transmitted from the first device 1, demodulating the signal to obtain an analog input signal, and outputting the signal, wherein the first device 1 includes: signal processing means 12 for applying signal processing to a digital signal obtained by digitizing the analog input signal; and digital-to-analog converting means 18 for converting an output digital signal from the signal processing means 12 into an analog input signal, emphasis means 3 for increasing a gain of a high-frequency signal of the analog input signal converted by the digital-to-analog converting means 18, and the signal processing means 12 includes: frequency band dividing means 22 for dividing the digital signal into a plurality of frequency bands; and signal compressing/expanding means for each band for compressing or expanding an output level separately for each band according to a level of the frequency band divided by the frequency band dividing means 22.

According to a fourth invention, in the third invention, there is provided a transmitting/receiving device, wherein the frequency band dividing means 22 includes at least: low-pass filter means 22a; and high-pass filter means 22n.

According to a fifth invention, in the third invention, there is provided a transmitting/receiving device, wherein the frequency band dividing means 22 includes: fast Fourier transform means 28 for fast-Fourier-transforming the digital signal; and reverse fast Fourier transform means 29 for reverse-fast-Fourier-transforming a signal obtained by compressing or expanding an output signal transformed into a frequency domain by the fast Fourier transform means 28.

According to the transmitting/receiving device of the third to fifth inventions, the band compressed due to excessively large input is only a part including a frequency spectrum of the excessively large input signal and the band that does not include the excessively large input is not compressed. Therefore, a feeling of reduction of the volume is suppressed as compared with a case in which all the bands are compressed simultaneously.

According to a sixth invention, in any one of the first to fifth inventions, there is provided a transmitting/receiving device, wherein an analog acoustic signal is input into a first device 1 of the transmitting/receiving device and electroacoustic transducing means 31 is provided to an output end of the second device 2.

According to the transmitting/receiving device of the sixth invention, it is possible to obtain the transmitting/receiving device in which an acoustic signal can be caused to come out as a sound without generation of noise and interruption of sound and with a suppressed feeling of reduction of the volume.

According toga seventh invention, there is provided a transmitting/receiving method for digitizing an analog input signal, analog-converting the signal again, and modulating and transmitting the signal and for receiving the transmitted signal, demodulating the signal to obtain an analog signal, and outputting the signal, wherein a digital signal obtained by digitizing the analog input signal is delayed and a delay output is compressed or expanded according to a signal level and transmitted or received.

According to the transmitting/receiving method of the seventh invention, by choosing the delay time, the level of the signal is predicted in advance and the value of the attenuation time can be fixed. As a result, it is possible to obtain the transmitting/receiving method without delay in control due to the rise time, overmodulation of the signal in the transmitting device, and generation of noise and interruption of the sound in transmission and reception.

DETAILED DESCRIPTION OF THE PREFERRED EMBODIMENT

Some embodiments of a transmitting/receiving device and a transmitting/receiving method of the present invention will be described in detail by reference to the drawings.

Figure 1:
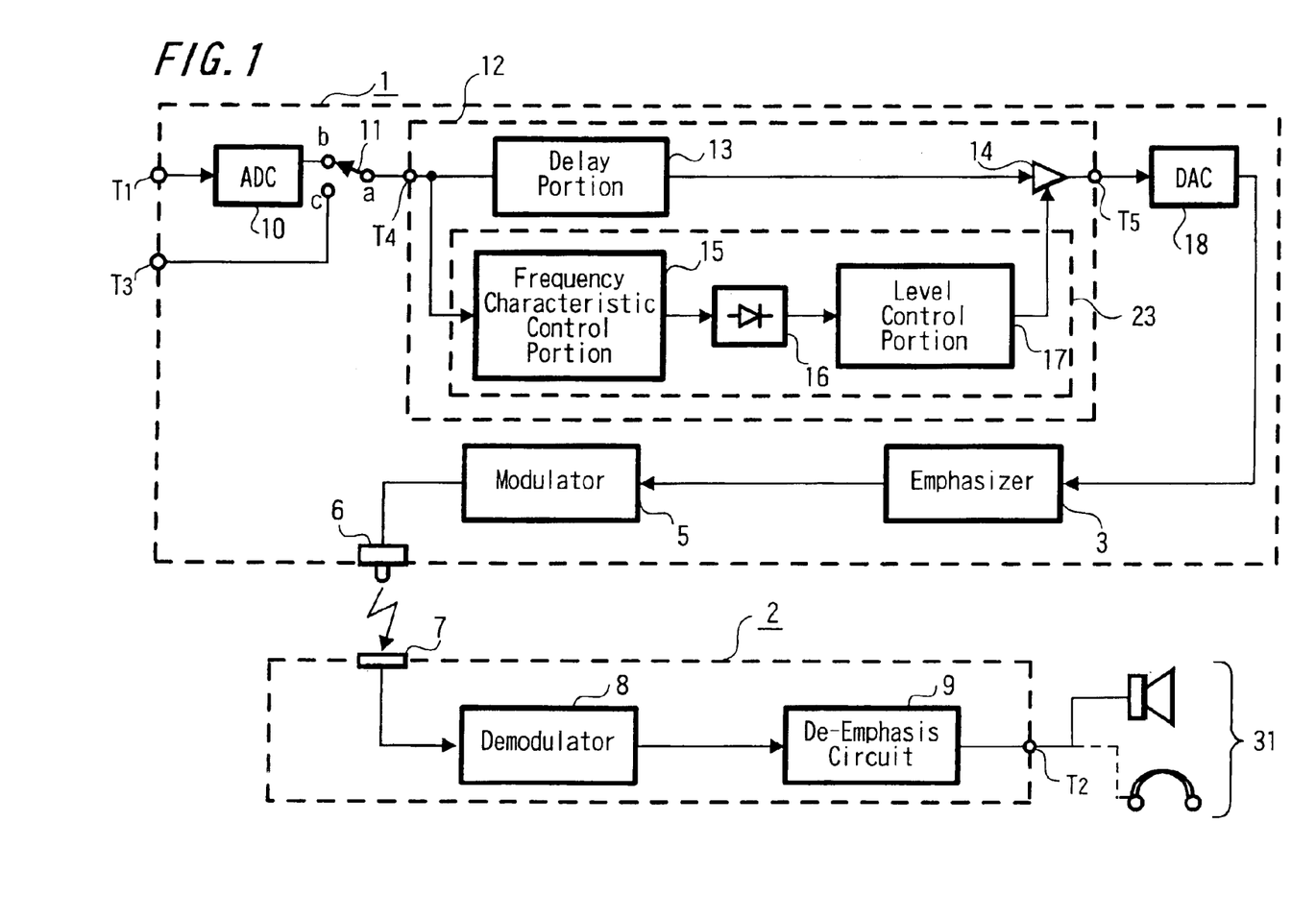
FIG. 1 is a system diagram of an embodiment of a transmitting/receiving device of the present invention.

FIG. 1 is a system diagram of the transmitting/receiving device showing an embodiment of the invention. A case in which acoustic signals such as voice and tone are wireless-transmitted through infrared radiation will be described based on FIG. 1.

In FIG. 1, an analog input signal such as an acoustic signal is supplied to an input terminal $T_1$ of a first device 1 forming a transmitting device.

A digital input signal formed by digitizing an acoustic signal is supplied to an input terminal $T_3$ from a compact disc (CD), for example.

An output side of the input terminal $T_1$ is connected to an input side of analog-to-digital converting means (hereafter referred to as ADC) 10 and a digital signal taken out on an output side of the ADC 10 is supplied to an input terminal $T_4$ of signal processing means 12 for processing the digital signal through a contact b-a of switching means 11.

On the other hand, an output side of the input terminal $T_3$ is directly connected to the input terminal $T_4$ of the signal processing means 12 through a contact c-a of the switching means 11.

Therefore, by switching the switching means 11, the digital signal formed by digitizing by the ADC 10 and the direct digital signal from the input terminal $T_3$ are supplied to the input terminal $T_4$ of the signal processing means 12.

The signal processing means 12 causes the digital signals supplied to the input terminal $T_4$ to diverge into two lines. The digital signal supplied to one line is output to an output terminal $T_5$ while a level of the digital signal is controlled through a delay portion 13 such as a delay and an attenuating portion 14 such as an attenuator. The digital signal supplied to the other line is supplied to an absolute value detecting portion 16 while high frequencies of the signal are boosted by a frequency characteristic control portion 15 constituting signal compressing/expanding means 23 similarly to the emphasis circuit 3 described based on FIG. 9.

In the absolute value detecting portion 16, an output level of the frequency characteristic control portion 15 is detected and level control is carried out in a level control portion 17 in the next stage according to the detected level.

Output of the level control portion 17 controls the attenuator of the attenuating portion 14 and fixes a value of the attenuating portion 14 as a predetermined value.

The fixed level value from the attenuating portion 14 is converted to an analog signal by a digital-to-analog converting circuit (hereafter referred to as DAC) 18 through the output terminal $T_5$, supplied to an emphasis circuit 3 where the signal is applied with a high-frequency boosting characteristic $H_B$ similarly to the case described based on FIG. 10(A), supplied to a modulator 5 such as FM where the signal is modulated, and transmitted to space through a transmitting (light-emitting) element 6 such as an infrared diode, thereby carrying out wireless transmission from the transmitting device 1 to a receiving device 2.

In the receiving device 2, the transmitted signal is received by a receiving (light-receptive) element 7 such as a pinphotodiode and demodulated in a demodulator 8 such as FM, and then, high frequencies of the transmitted signal are reduced in a de-emphasis circuit 9 having a high-frequency down characteristic $H_L$ as shown in FIG. 10(B) that is a characteristic reverse to that of emphasis circuit 3. Thus, an acoustic signal with improved S/N and widened dynamic is caused to come out as a sound to electroacoustic transducing means 31 such as a headphone and a speaker connected to an output terminal $T_2$.

Figure 2:
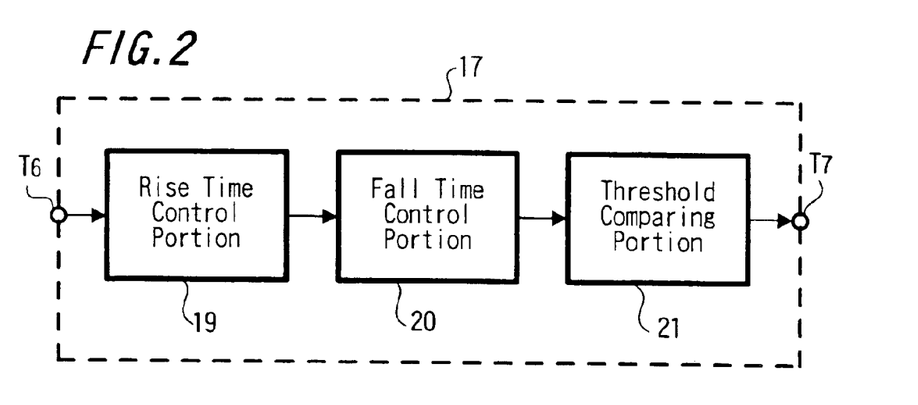
FIG. 2 is a system diagram of a level control portion used for FIG. 1.

An example of a functional system diagram of the level control portion 17 in the signal compressing/expanding means 23 in FIG. 1 is shown in FIG. 2.

In FIG. 2, the predetermined level signal supplied from the absolute value detecting portion 16 to the input terminal $T_6$ of the level control portion 17 is supplied to a rise time control portion 19, controls a rise time of the level, and fixes the rise time.

Furthermore, a fall time control portion 20 fixes a fall time of the level.

The rise time control portion 19 and the fall time control portion 20 are inserted so as to remove a sense of disharmony in audibility due to a steep change of the attenuating portion 14.

A level value detected by the above rise and fall time control portions 19 and 20 is supplied to a threshold comparing portion 21. If a level value detected by the threshold comparing portion 21 is larger than a predetermined threshold value, an attenuation coefficient of the attenuator of the attenuating portion 14 is calculated and output to an output terminal $T_7$ and a value of the attenuating portion 14 is fixed.

If a delay time of the delay portion 13 shown in FIG. 1 is zero in this case, there is a portion that cannot be attenuated satisfactorily by high frequencies due to time delay by the rise time control portion 15 similarly the case of FIG. 9. Therefore, by choosing the delay time of the delay portion 13, the level of the signal is predicted in advance and the value of the attenuating portion 14 can be fixed. As a result, it is possible to prevent delay in control due to the rise time, overmodulation of the signal in the transmitting device 1, and generation of noise and interruption of the sound in transmission and reception.

Figure 3:
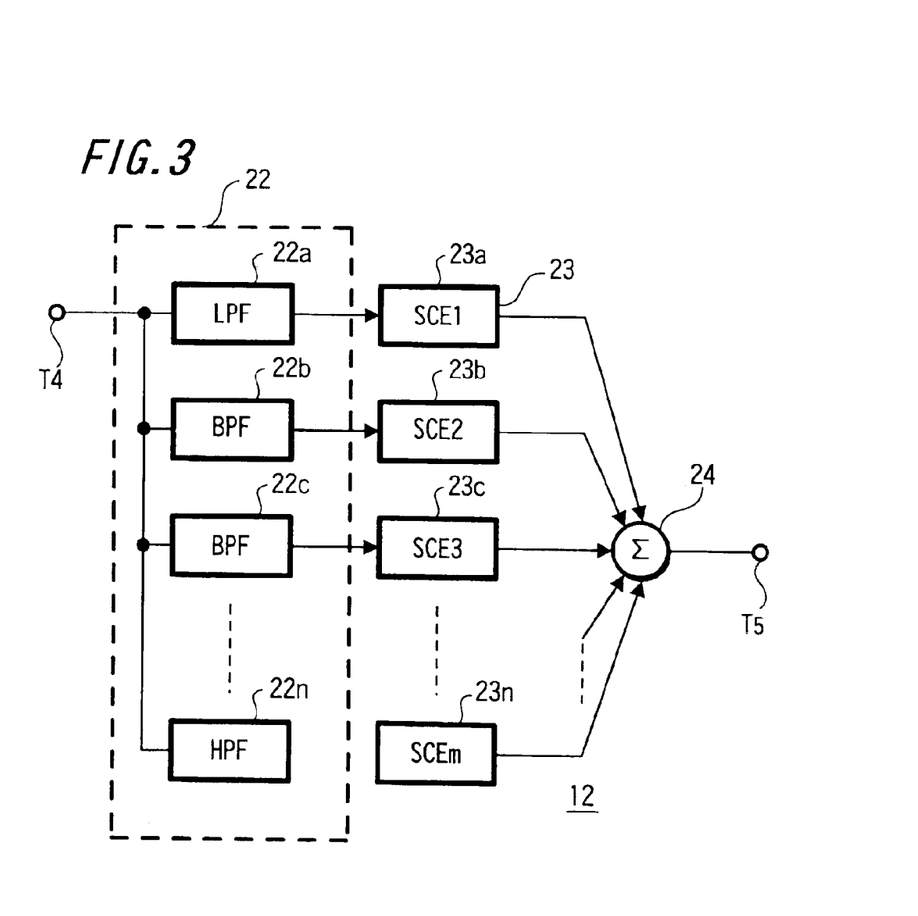
FIG. 3 is another system diagram of signal processing means used for the transmitting/receiving device of the invention.

FIG. 3 shows another embodiment of the signal processing means 12 in FIG. 1. The signal processing means 12 is formed of frequency band dividing means 22 and a group 23 of signal compressing/expanding means and a digitized input signal is supplied to an input terminal $T_4$ of the signal processing means 12 and supplied to the frequency band dividing means 22.

The frequency band dividing means 22 divides the input signal into a plurality of frequency bands. For example, the input signal diverges into a plurality of low-pass filter (hereafter referred to as LPF) 22a, band-pass filters (hereafter referred to as BPF) 22b, 22c, . . . , high-pass filter (hereafter referred to as HPF) 22n, and the like and digitized input signal is divided into a predetermined bands.

Figure 4:
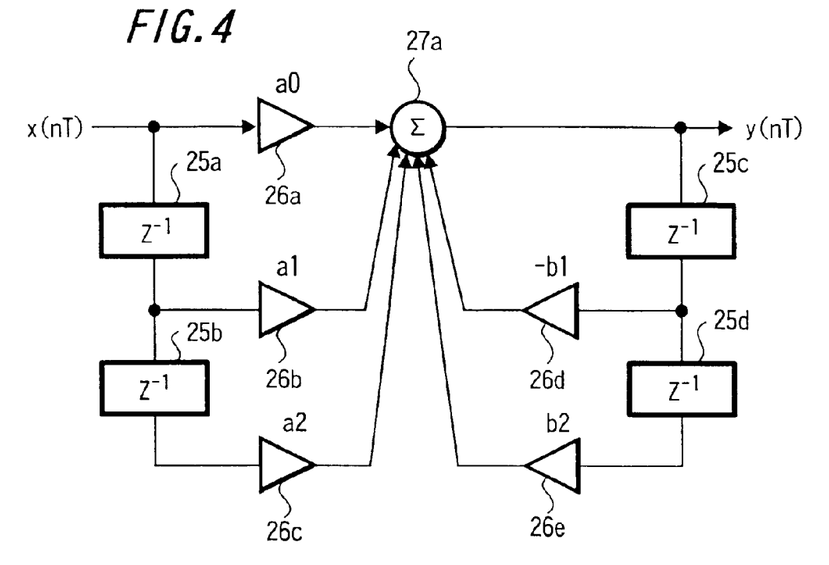
FIG. 4 is a system diagram of a digital filter used for FIG. 3.

Digital filters as shown in FIG. 4, for example, can be used as the above LPF 22a, BPFs 22b, 22c, . . . , and HPF 22n.

FIG. 4 shows a secondary IIR (Infinite Impulse Response) filter. Reference numerals 25a, 25b, 25c, and 25d designate delayers, 26a, 26b, 26c, 26d, and 26e multipliers, 27a an adder, and x(nT) and y(nT) input and output terminals. According to such a digital filter, it is possible to easily obtain the LPF 22a, HPF 22n, and BPF 22b with predetermined frequency characteristics by properly determining coefficients of the multipliers 26a to 26e.

A plurality of outputs y(nT) of the LPF 22a, BPFs 22b, 22c, . . . , and HPF 22n are supplied to respective SCE1 23a, SCE2 23b, SCE3 23c, . . . , and SCEn 23n of the group 23 of the plurality of signal compressing/expanding means (hereafter referred to as SCE). The respective signals divided into predetermined bands are subjected to a compressing or expanding processing depending on their level.

Figure 5:
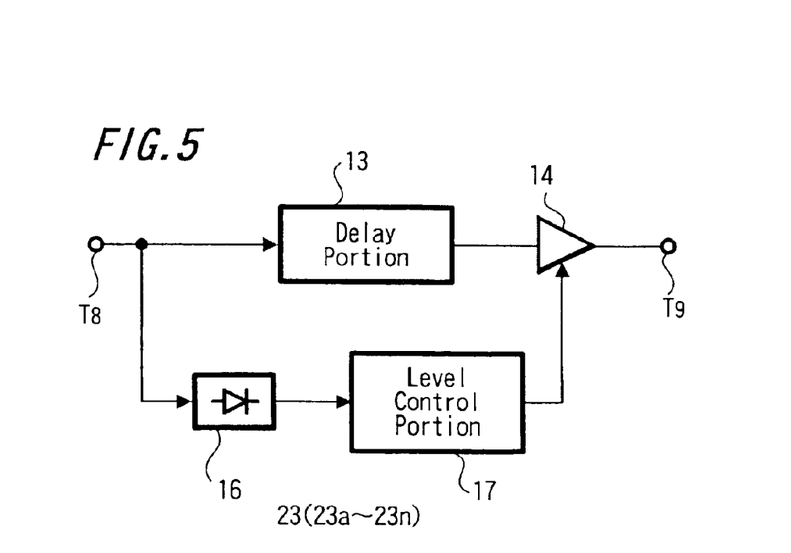
FIG. 5 is a system diagram of a group of signal compressing/expanding means used for FIG. 3.

SCE1 26a to SCEn 26n can be formed as shown in FIG. 5. In FIG. 5, filter outputs from the respective LPF 22a, BPF 22b, BPF 22c, ..., and HPF 22n of the frequency band dividing means 22 are applied to an input terminal $T_8$. The filter outputs are delayed in the delay portion 13 and supplied to the attenuator of the attenuating portion 14. On the other hand, filter output that has diverged is supplied to the level control portion 17 through the absolute value detecting portion 16 and the attenuation value of the attenuating portion 14 is controlled by the control output of the level control portion 17.

The level control portion 17 in FIG. 5 has a similar structure to that in FIG. 2.

According to the above-described signal processing means 12 with the structure in FIG. 3, the band compressed due to excessively large input is only apart including a frequency spectrum of the excessively large input signal and the band that does not include the excessively large input is not compressed. Therefore, a feeling of reduction of the volume is suppressed as compared with a case in which all the bands are compressed simultaneously.

Figure 6:
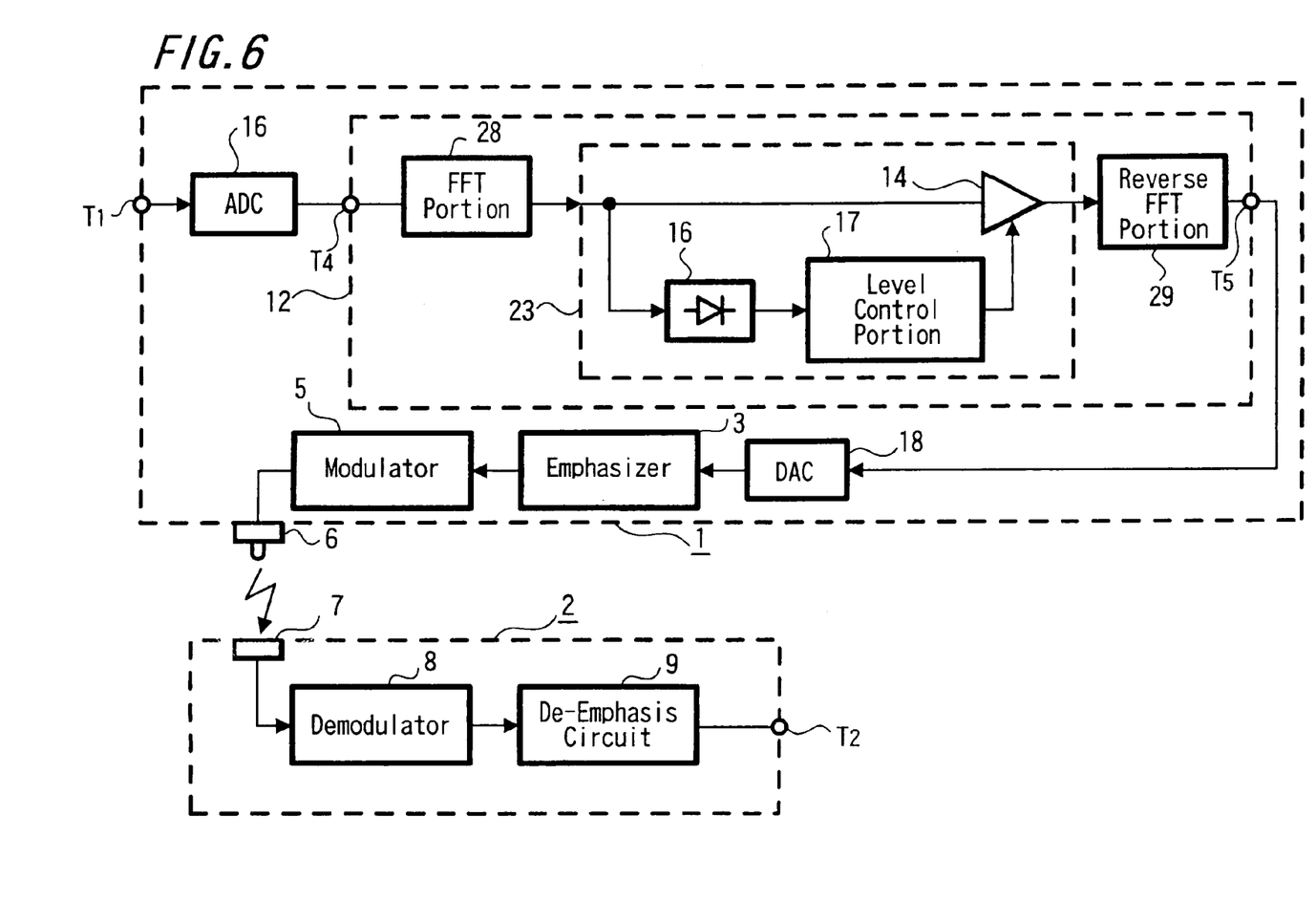
FIG. 6 is a system diagram of another embodiment of the transmitting/receiving device of the invention.

FIG. 6 shows yet another embodiment of the transmitting/receiving device of the invention. Because an only difference between FIG. 6 and FIG. 1 is the signal processing means 12, portions corresponding to those in FIG. 1 are provided with the same reference numerals to omit description of them in FIG. 6.

In the signal processing means 12 in FIG. 6, a digital input signal from ADC 10 is supplied to an input terminal $T_4$, transformed to a frequency domain by fast Fourier transform by a fast Fourier transform (FFT) portion 28, supplied to signal compressing/expanding means 23, subjected to a compressing processing in the frequency domain, reverse-fast-Fourier-transformed by a reverse fast Fourier transform portion 29, and output to an output terminal $T_5$.

The signal compressing/expanding portion 23 causes output of the fast Fourier transform portion 28 to diverge into two lines one of which is supplied to an attenuating portion 14 and the other of which is supplied to an absolute value detecting portion 16 and a level control portion 17 similar to those in FIG. 5 and controls the attenuating portion 14 by level control output.

In other words, an absolute value of each the fast-Fourier-transformed frequency signal is detected by the absolute value detecting portion 16 and the frequency signal judged to be an excessively large signal based on the absolute value is attenuated by the attenuating portion 14 according to a value calculated by the level control portion 17.

In the case of this structure, the band compressed due to excessively large input is only a part including a frequency spectrum of the excessively large input signal and the band that does not include the excessively large input is not compressed similarly to FIG. 3. Therefore, a feeling of reduction of the volume is suppressed as compared with the case in which all the bands are compressed simultaneously.

Figure 7:
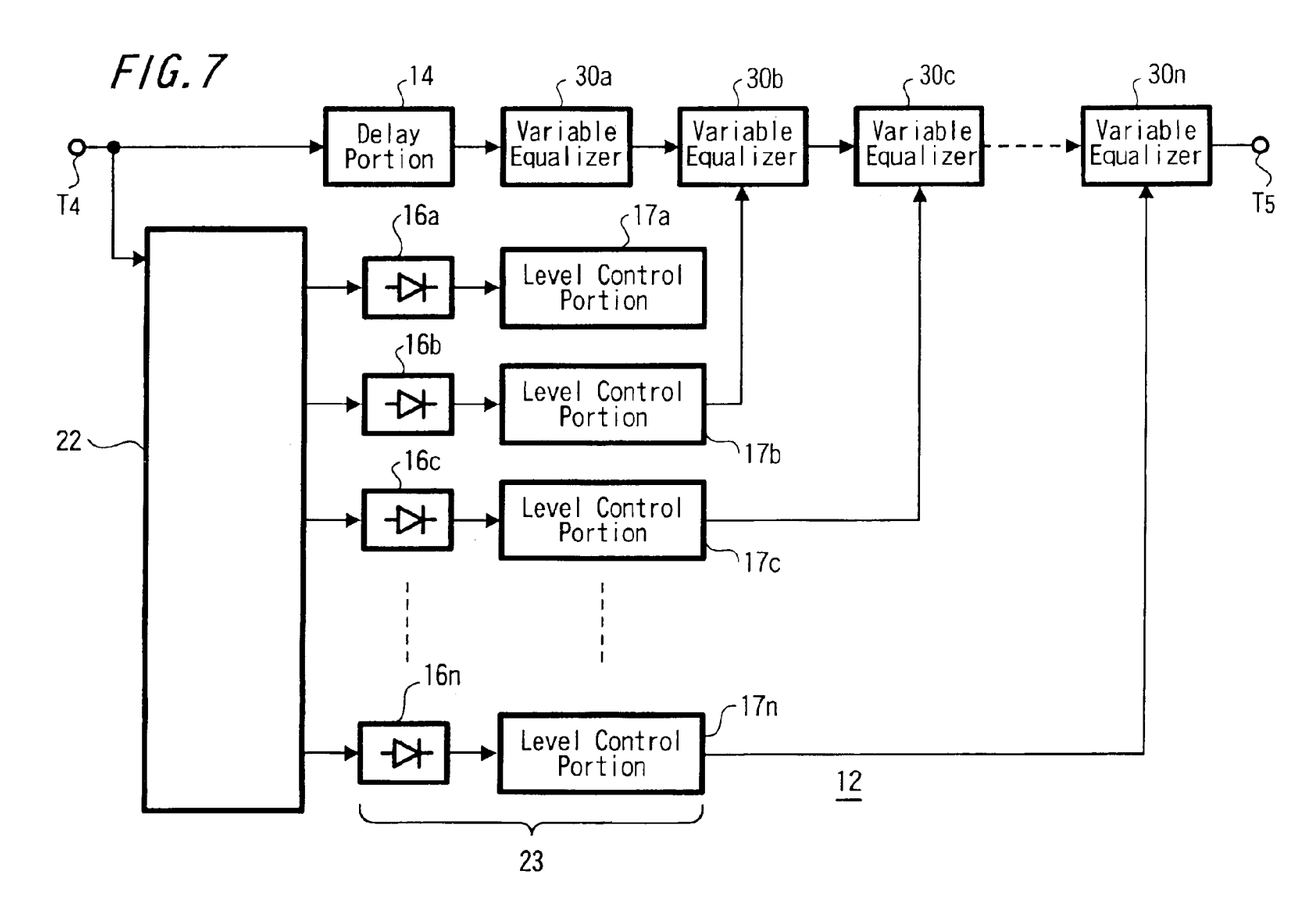
FIG. 7 is a yet another system diagram of signal processing means used for the transmitting/receiving device of the invention.

FIG. 7 shows yet another embodiment of the transmitting/receiving device of the invention. A digitized input signal from ADC 10 is supplied to an input terminal $T_4$ of a signal processing portion 12 of the embodiment and caused to diverge into two lines. The signal on one line is output to an output terminal $T_5$ through a plurality of variable equalizers 30a, 30b, 30c, ..., and 30n concatenated with a delay portion 14.

The input signal on the other line is divided into a plurality of bands by frequency band dividing means 22 similar to that in FIG. 3, compression or expansion levels according to respective levels of the respective signals are calculated by absolute value detecting portions 16a, 16b, 16c, ..., and 16n and level control portions 17a, 17b, 17c, ..., and 17n similar to those in FIG. 5 which constitute the signal compressing/expanding means 23, and the calculated values make levels of the plurality of concatenated variable equalizers variable.

Figure 8:
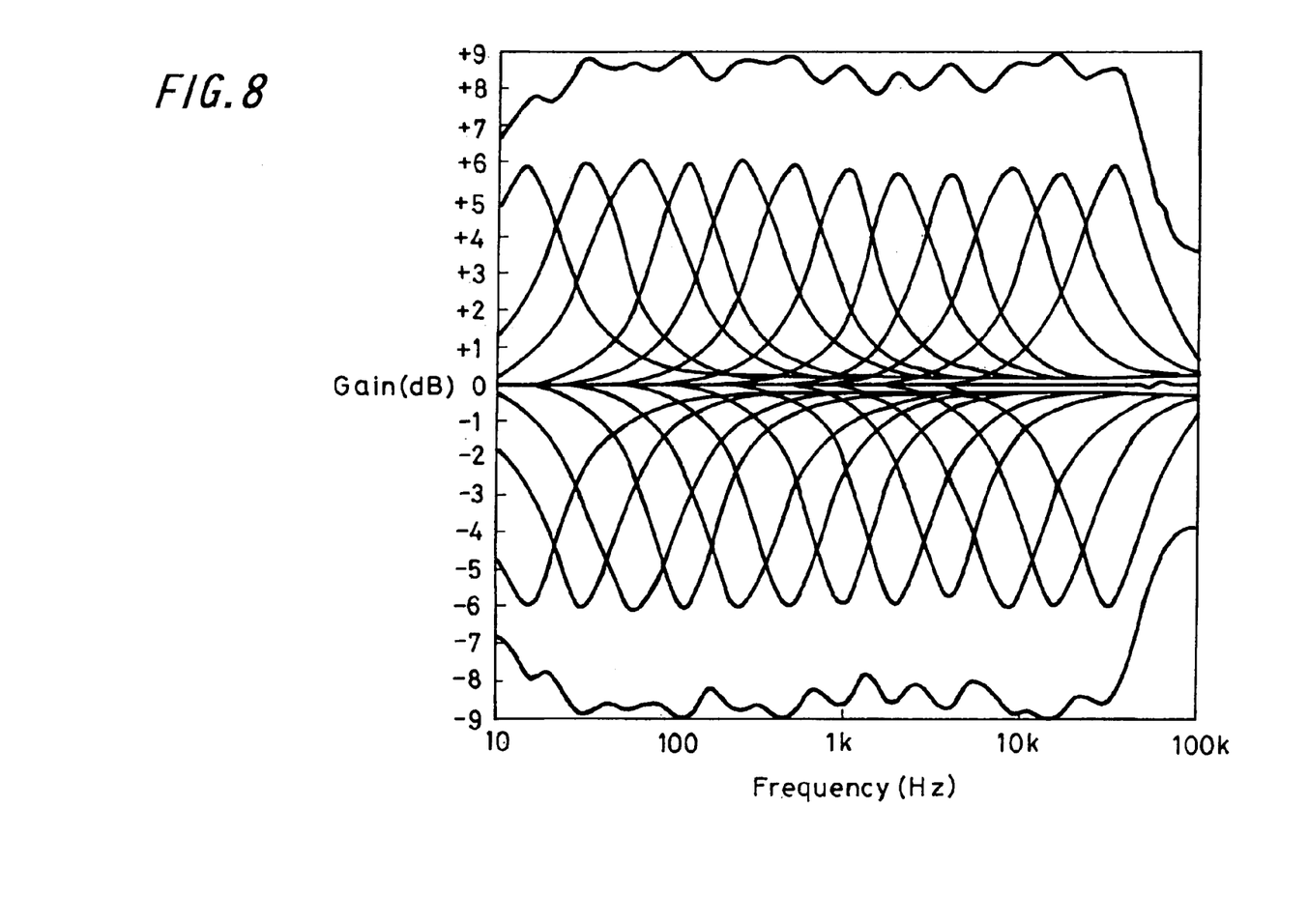
FIG. 8 is a characteristic diagram of a graphic equalizer showing an example of the invention.

The variable equalizers 30a to 30n are formed of digital filters similar to those described in detail based on FIG. 4. By changing coefficient values of the multipliers of the digital filters, levels of the respective bands change. FIG. 8 shows an example of a frequency characteristic of the digital filter.

With this structure, it is possible to obtain a graphic equalizer that can be controlled in a digital manner and to obtain a graphic equalizer in which a feeling of reduction of the volume is suppressed as compared with a case in which all the bands are compressed simultaneously because the frequency band division is carried out similarly to FIG. 3.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A wireless transmitting/receiving device comprising:

a first device having transmitting means for modulating and transmitting an analog input signal; and a second device having receiving means for receiving said signal transmitted by said first device, for demodulating said signal to obtain an analog signal, and for outputting said analog signal, wherein said first device includes:

signal processing means for applying signal processing to a digital signal obtained by digitizing said analog input signal and producing an output digital audio signal, digital to analog converting means for converting said output digital audio signal from said signal processing means into an analog signal, emphasis means including one means for increasing a gain of a high frequency portion of said analog signal converted by said digital to analog converting means and means for increasing a gain of a high frequency portion of said digital signal in said signal processing means, and said signal processing means includes:

delay means for delaying said digital signal; and signal compressing/expanding means for compressing or expanding a level of a delay output signal of said delay means according to a level of an input signal of said signal processing means.

2. The transmitting/receiving device according to claim 1, wherein said signal compressing/expanding means includes:

frequency characteristic control means for applying a frequency characteristic to said digital signal supplied to said signal processing means;

absolute value detecting means for detecting an absolute value of a signal level of an output signal from said frequency characteristic control means; and level control means for changing said signal level of said output signal of said delay means according to said absolute value detected by said absolute value detecting means.

3. A wireless transmitting/receiving device comprising:
a transmitting device having transmitting means for modulating and transmitting an input analog audio signal; and a receiving device having receiving means for receiving a signal transmitted by said transmitting device, for demodulating said signal to obtain an analog audio signal, and for outputting said analog audio signal,
wherein said transmitting device includes:
signal processing means for applying signal processing to a digital audio signal obtained by digitizing said input analog audio signal and producing an output digital signal,
digital to analog converting means for converting said output digital audio signal from said signal processing means into an analog audio signal,
emphasis means including one of means for increasing a gain of a high frequency portion of said analog audio signal converted by said digital to analog converting means and means for increasing a gain of a high frequency portion of said digital signal in said signal processing means, and
said signal processing means includes:
delay means for delaying said digital audio signal; and
signal compressing/expanding means for compressing or expanding a level of a delay output signal of said delay means according to a level of said digital audio signal input to said signal processing means.

4. The transmitting/receiving device according to claim 3, wherein said signal compressing/expanding means includes:
frequency characteristic control means for applying a frequency characteristic to said digital audio signal supplied to said signal processing means;
absolute value detecting means for detecting an absolute value of a signal level of a digital audio output signal from said frequency characteristic control means; and
level control means for changing said level of said delay output signal from said delay means according to said absolute value detected by said absolute value detecting means.

5. A wireless transmitting/receiving device comprising:
a first device having transmitting means for modulating and
transmitting an analog input signal; and a second device having receiving means for receiving a signal transmitted from said first device, for demodulating said signal to obtain an analog signal, and for outputting said analog signal,
wherein said first device includes:
signal processing means for applying signal processing to a digital signal obtained by digitizing said analog input signal; and
digital to analog converting means for converting an output digital signal from said signal processing means into an analog signal; and
said signal processing means includes:
frequency band dividing means for dividing said digital signal into a plurality of frequency bands; and
signal compressing/expanding means for each band of said plurality of frequency bands for compressing or expanding an output level separately for each said band according to respective levels of said plurality of frequency bands divided by said frequency band dividing means.

6. The transmitting/receiving device according to claim 5, wherein said frequency band dividing means includes:
low pass filter means; and
high pass filter means.

7. The transmitting/receiving device according to claim 5, wherein said frequency band dividing means includes:
fast Fourier transform means for fast Fourier transforming said digital signal; and
reverse fast Fourier transform means for reverse fast Fourier transforming a signal obtained by compressing or expanding a frequency domain output signal transformed by said fast Fourier transform means.

8. A wireless transmitting/receiving device comprising:
a transmitting device having transmitting means for modulating and transmitting an analog audio input signal; and
a receiving device having receiving means for receiving a signal transmitted from said transmitting device, for demodulating said signal to obtain an analog audio signal, and for outputting said analog audio signal,
wherein said device includes:
signal processing means for applying signal processing to a digital audio signal obtained by digitizing said analog audio signal; and
digital to analog converting means for converting an output audio digital signal from said signal processing means into an analog audio signal, and
said signal processing means includes:
frequency band dividing means for dividing said digital audio signal into a plurality of frequency bands; and
signal compressing/expanding means for each band of said plurality of frequency bands for compressing or expanding an audio output level separately for each band according to a level of said digital audio signal fed to said frequency band dividing means.

9. The transmitting/receiving device according to claim 8, wherein said frequency band dividing means includes:
low pass filter means; and
high pass filter means.

10. The transmitting/receiving device according to claim 8, wherein said frequency band dividing means includes:
fast Fourier transform means for fast Fourier transforming said digital audio signal; and
reverse fast Fourier transform means for reverse fast Fourier transforming a signal obtained by compressing or expanding a frequency domain output signal transformed by said fast Fourier transform means.

* * * * *